United States Patent [19]

Ozone

[11] 4,054,883
[45] Oct. 18, 1977

[54] INK PEN DEVICE
[75] Inventor: Kiyoharu Ozone, Ibaragi, Japan
[73] Assignee: Kabushiki Kaisha Daini Seikosha, Japan
[21] Appl. No.: 665,882
[22] Filed: Mar. 11, 1976
[30] Foreign Application Priority Data
  Mar. 12, 1975 Japan ............................ 50-33276[U]
  Mar. 13, 1975 Japan ............................ 50-34188[U]
[51] Int. Cl.² ........................................ G01D 15/16
[52] U.S. Cl. ................................ 346/140 R; 346/141
[58] Field of Search ............................ 346/140 R, 141
[56] References Cited
U.S. PATENT DOCUMENTS

| 3,083,689 | 4/1963 | Hegener | 346/140 |
| 3,543,279 | 11/1970 | Rempel | 346/141 |
| 3,909,831 | 9/1975 | Marchio | 346/140 |

FOREIGN PATENT DOCUMENTS 738,745  10/1955  United Kingdom ................ 346/140

Primary Examiner—Joseph W. Hartary
Attorney, Agent, or Firm—Robert E. Burns; Emmanuel J. Lobato; Bruce L. Adams

[57] ABSTRACT

An ink pen has an ink tank for supplying ink to a pen nib such as a needle or capillary tube nib. The ink tank is connected to a change-over valve by way of an air pipe. The valve opens the ink tank into a positive pressurized air source for pressing ink out in good moderation through the nib during writing or drawing operation of the ink pen. On the other hand, when the ink pen is stopped to operate writing or drawing, the valve opens the ink tank in turn into a negative pressurized air source for preventing ink in the tank from leaking out or dropping down through the nib.

6 Claims, 4 Drawing Figures

INK PEN DEVICE

BACKGROUND OF THE INVENTION

This invention relates to an ink pen device for a drawing or plotting apparatus or the like.

In the prior art, it is well known that an ink pen having a needle nib is used in a state as the ink tank is kept slightly minus pressurized for preventing ink from overflowing out and allowing proper quantity of ink to flow through the nib. The pen of this kind could not be used for higher speed drawing as the pen traced line becomes scratchy because of poor ink supply to the nib.

This limits the upper drawing speed of the drawing or plotting apparatus.

BRIEF SUMMARY OF THE INVENTION:

The principal object of this invention is to provide an ink pen device available both for high and low speed drawing.

This and other objects have been attained by the ink pen device which comprises an ink pen and a change-over valve to selectively open the ink tank of the ink pen into a positive or negative pressurized air source.

BRIEF DESCRIPTION OF THE DRAWINGS:

The drawings show an embodiment of an ink pen device according to the present invention, in which.

DETAILED DESCRIPTION OF THE PREFERRED EMBODIMENT:

Referring now to the attached drawings, an embodiment of the invention will be described hereinafter.

Figure 1:
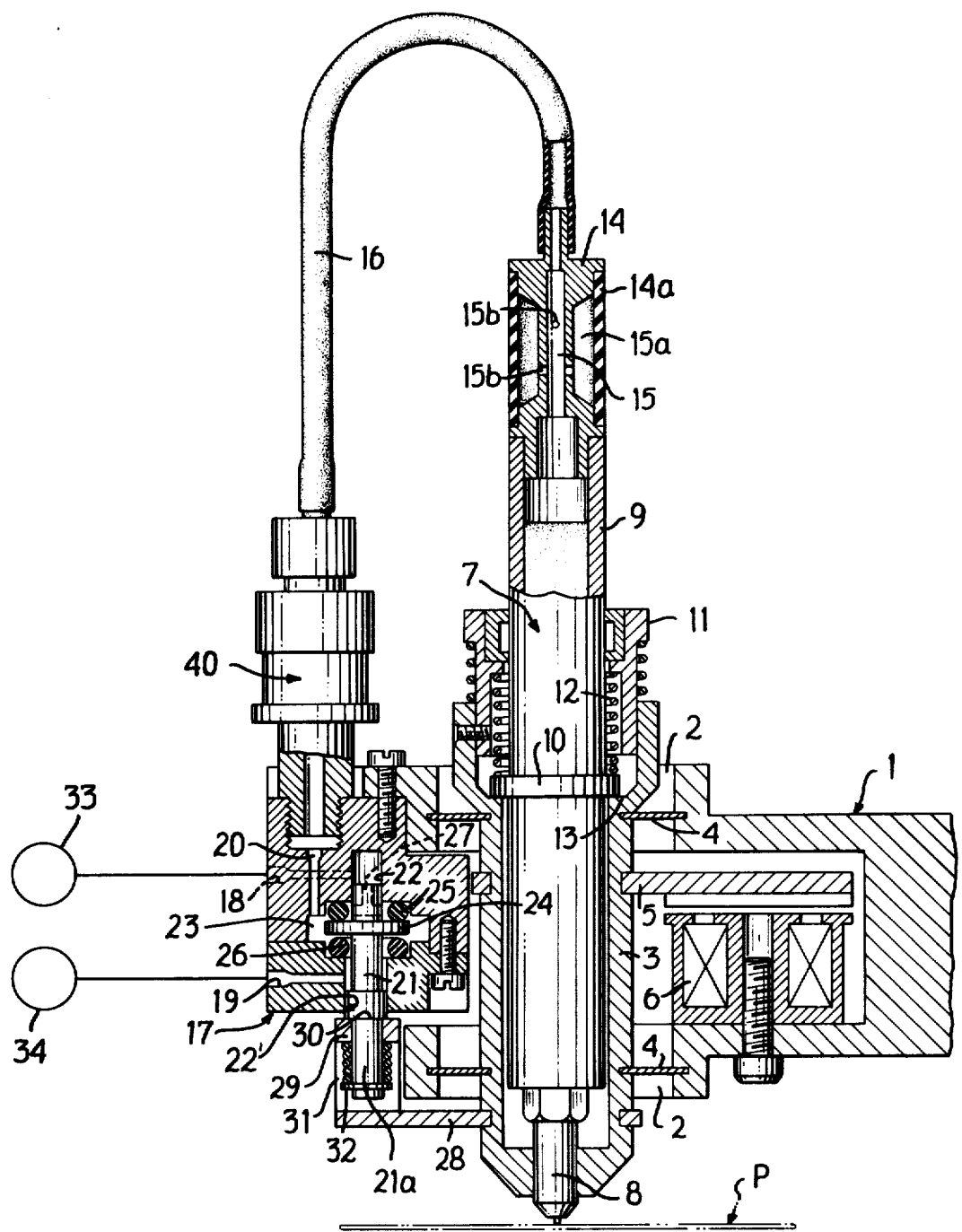
FIG. 1 is an elevational sectional view showing an ink pen device.

Reference numeral 1 in FIG. 1 designates an ink pen supporter which is a member of a drafting head. A straight through-hole 2 is formed in ink pen supporter 1, in which a pen sleeve 3 is suspended longitudinally by disk-shaped leaf springs 4 which are respectively fixed on ink pen supporter 1 at the rims. Accordingly, ink pen supporter 1 is capable of moving in the longitudinal direction thereof.

Numeral 5 designates a moving iron plate securely fixed on pen sleeve 3. Below moving iron plate 5, there is provided an electro magnet 6 with a proper distance from the iron plate 5. Accordingly, when electro magnet 6 is energized, moving iron plate 5 moves downward accompanying pen sleeve 3 against elastic force of leaf springs 4, and in the case of deenergization of electro magnet 6, moving iron plate 5 and pen sleeve 3 return upward with the aid of the leaf spring force.

Numeral 7 designates an ink pen consisting of a pen nib 8 and a cylindrical ink tank 9 which leads downward to the nib and stores ink therein. Said ink pen 7 has a flnage 10 on the middle periphery thereof. Ink pen 7 is disposed slidably in pen sleeve 3 with flange 10 on an inner shoulder 13 of the sleeve. In the upper space over flange 10, there is mounted a coiled spring 12 inserting ink pen 7. A spring supporter 11 for spring 12 is inserted slidably in the upper cylindrical portion of pen sleeve 3. Said spring supporter 11 is connected to pen sleeve 3 with a bayonet assembly. Accordingly, ink pen 7 is held downward by spring 12, pen nib 8 protruding downward from pen sleeve 3.

Numeral 14 designates a cap removably fixed on the top of ink tank 9, sealing the ink tank 9. Said cap 14 has a center hollow 15 and an annular groove 15a which is opened to center hollow 15 through small openings 15b. Said annular groove 15a is covered with an elastic cylindrical wall 14a such as a rubber tube. Said center hollow 15 leads to change-over valve means including a change-over valve 17 through a flexible pipe 16 and a hose coupling 40 so that ink tank 9 is opened to change-over valve 17.

Figure 2:
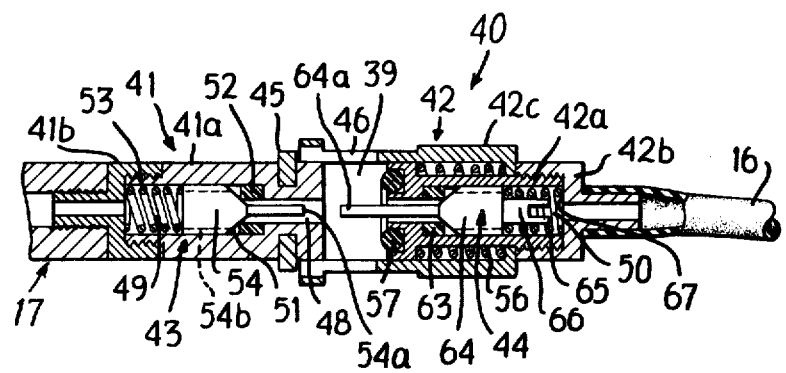
FIG. 2 to 4 are longitudinal sectional views respectively showing the coupling used in the ink pen device of FIG. 1 in various states.
Figure 3:
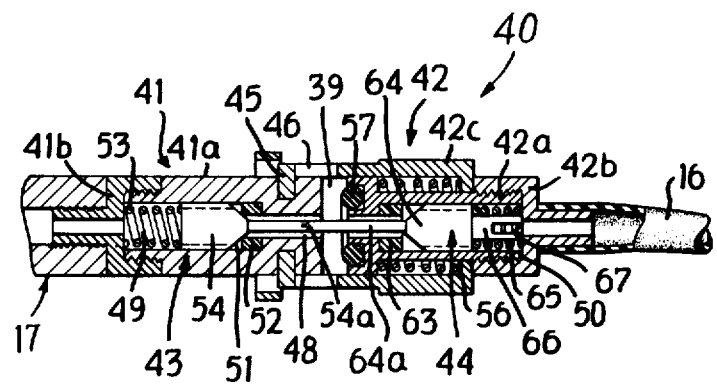
Figure 4:
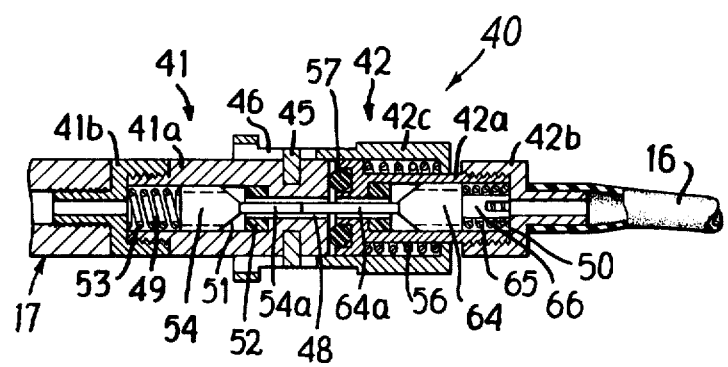

Said hose coupling 40 is particularly illustrated in FIGS. 2 to 4, in which the coupling consists of a pair of coupling members 41 and 42. Each of coupling members 41 and 42 has a valve 43 or 44 therein. Coupling member 41 has a cylindrical body 41a and a connecting plug 41b securely screwed on the end of the body 41a. The other coupling member 42 has a cylindrical body 42a, a connecting plug 42b securely screwed on the end of the body 42a, and a moving sleeve 42c covering the body 42a slidably and rotatably. Connecting plug 41b is securely screwed with said change-over valve 17, while the other connecting plug 42b is connected with said flexible pipe 16. Moving sleeve 42c is fittable on cylindrical body 41a, pins 45 protruded from the outer periphery of cylindrical body 41a being engageable with bent slots 46 formed in moving sleeve 42c so as to connect coupling member 41 with the other coupling member 42 with a bayonet connection. Coiled spring 56 is mounted between coupling body 42a and moving sleeve 42c for giving suitable connecting force on the coupling faces of coupling bodies 41a and 42a, between which there is provided a sealing O-ring 57.

In coupling bodies 41a and 42a, there are respectively formed valve chambers 49 and 50. In the valve chamber 49, there is slidably provided a valve spool 54 which has a tapered portion 51 engageable with an elastic valve seat 52 for closing the air path from change-over valve 17 to the front space 39 of coupling member 41, said valve spool 54 being forced to push valve seat 52 by a spring 53. Valve spool 54 is provided with a long portion 54a projected into the outside path 48, and longitudinal slots 54b for passing air on the periphery thereof. In the other valve chamber 50, there are provided a slidable valve spool 64, an elastic valve seat 63 and a spring 65 which are similar to those in valve chamber 49, the projected portion 64a of valve spool 64 elongating out through said O-ring 57. Valve spool 64 further has a stopper pin 66 at the rear end thereof, said stopper pin 66 being engageable with the bottom 67 of connecting plug 42b when valve spool 64 is pushed in against the elastic force of spring 65.

Therefore, when coupling members 41 and 42 are separated with the bayonet 45 and 46 disengaged, both of the valves 43 and 44 are kept closed at the valve seats 52 and 63, as shown in FIG. 2.

In connecting process of coupling members 41 and 42, the projected portion 54a of valve spool 54 at first comes in contact with the projected portion 64a of valve spool 64 and pushes spool 64 till the pin 66 pushes the bottom 67 of connecting plug 42b, opening valve 44 as shown in FIG. 3, the elastic force of spring 53 being stronger than that of spring 65. Further putting of sleeve 42c on the cylindrical body 41a of coupling member 41 makes valve spool 64 push, in turn, valve spool 54 against spring 53 and open valve 43, as shown in FIG. 4.

Again referring to FIG. 1, said change-over valve 17 has a pair of inlets, one 18 being connected to positive pressurized air source 33 and the other to negative pressurized air source 34. The outlet 20 of change-over valve 17 is alternatively connected to one of the inlets 18 and 19 so as to open pipe 16 to the positive pressurized air source 33 or the negative pressurized air source 34.

Numeral 21 designates a spool supported vertically and slidably by guide hollows 22 and 22', the valve plate 24 flanged on spool 21 being spaced in a valve chamber 23. Numerals 25 and 26 designate O-rings mounted, as valve seats, respectively on upper and lower walls of valve chamber 23. Said inlet 18 opens into valve chamber 23 through a T-hole 27 formed in spool 21 in the case when spool 21 is shifted downward so as to press valve plate 24 against valve seat 26, while said inlet 19 opens into valve chamber 23 through the gap between spool 21 and guide hollow 22' when spool 21 is shifted upward as shown in FIG. 1.

Numeral 28 designates a bracket securely fixed on the lower portion of said pen sleeve 3, a connecting portion 29 of said bracket 28 surrounding the lower projection 21a below a shoulder 30 of spool 21 with suitable gap. Therefore, spool 21 is normally shifted upward by the elastic force of leaf springs 4. Numeral 31 designates a spring mounted between the connecting portion 29 of bracket 28 and a spring supporter 82 fixed on the lower projection 21a of spool 21. When electro magnet 6 is energized to shift pen sleeve 7 downward with bracket 28, said spring 31 is compressed to absorb the overstroke of bracket 28 after valve plate 24 becomes in contact to valve seat 26.

This ink pen device, as a part of the drafting head as mentioned first, runs along a desired line parallel to writing sheet P according to drafting control signal, while electro magnet 6 is energized by actual writing signal, i.e., pen-down signal to shift pen sleeve 3 down against elastic force of leaf springs 4, making ink pen 7 in suitable pressure contact with writing sheet P through some compression of spring 12. With this downward movement of pen sleeve 3, change-over valve 17 is shifted to open ink tank 9 into positive pressurized air source 33. As a result, ink tank 9 is pressurized by a little higher pressure than the atmosphere, which causes forced ink supply to pen nib 8 from ink tank 9. As drafting signal for running the drafting head occurs almost simultaneously to the pen-down signal, high speed drafting is performed in excellent condition.

When electro magnet 6 is deenergized for pausing writing, pen sleeve 3 returns upward with the aid of leaf springs 4, pen nib 8 departing from writing sheet P, and change-over valve 17 is shifted to open ink tank 9 into negative pressurized air source 34. Thus, ink tank 9 is a little negative pressurized to the atmosphere, preventing ink of ink tank 9 from flowing into pen nib 8.

In interchange of ink pen 7, hose coupling 40 should at first be released. After releasing of coupling 40, ink tank 9 still remains negative pressurized as valve 44 is immediately closed. Then, spring supporter 11 is departed from pen sleeve 3, releasing bayonet, together with ink pen 7. The used ink pen will be replaced by a new one in a manner that cap 14 is removed from the used ink tank 9 and a new ink tank 9 is mounted on cap 14, elastic wall 14 being depressed by hand for producing negative pressure in ink tank 9 and pipe 16 after the coupling of ink tank 9 to cap 16. There is no trouble of ink overflow during interchange of ink tank 9.

What is claimed is:

1. An ink pen device comprising: an ink pen having a pen nib and an ink tank for supplying ink to the pen nib; means for supporting the ink pen for upward and downward axial movement thereof; means for shifting the ink pen downward to move the pen nib into a predetermined writing position and upward to move the pen nib out of the writing position; and changeover valve means receptive of sources of positive and negative pressurized air and connected to said ink tank and responsive to the shifting of the ink pen by the shifting means for directing positive pressurized air into the ink tank during downward movement of the pen nib into the writing position and for directing negative pressurized air into the ink tank during upward movement of the pen nib out of the writing position to simultaneously effect an ink pen shift with a pressure change.

2. An ink pen device according to claim 1, wherein said shifting means comprises first and second shifting members for effecting the shifting of the ink pen and wherein said changeover valve means comprises a slidable valve spool for alternatively selecting the positive or negative pressurized air source and means mechanically coupling the valve spool to the shifting members.

3. An ink pen device according to claim 2, wherein said shifting means further comprises an electromagnet for actuating said shifting members.

4. An ink pen device according to claim 1, wherein means for supporting comprises a sleeve receptive of the ink pen therein for sliding movement along the longitudinal axis of the ink pen, a spring disposed between the ink pen and the sleeve for biasing the ink pen downward therein, a plurality of leaf springs connected between the sleeve along the longitudinal axis of the ink pen against the spring force thereof, and means connected to the sleeve to force same downward against the spring force of the leaf springs.

5. An ink pen device comprising: an ink pen having a pen nib and an ink tank for supplying ink to the pen nib, said ink tank having a cap including at least a portion thereof comprising an elastic wall for manual deformation; a hose having one end connected to said ink tank; means for coupling the hose to a fluid supply including a first coupling member having a fluid passage therethrough and connected to the other end of said hose, a second coupling member having a fluid passage therethrough and releasably engageable with said first coupling member to connect same thereto and receptive of the fluid supply to communicate same to said hose when engaged with said first coupling member, a normally closed valve disposed in each fluid passage of said coupling members to open and close the fluid passages and means disposed in each of said coupling members for effecting the opening of the valves in the coupling members in response to the engagement and connection of the coupling members to each other.

6. An ink pen device according to claim 5, wherein the valves each include a valve spool and wherein the valve opening means comprises a spring in each coupling member biasing the valve spool closed and a projecting member projecting from each valve spool and extending towards the engaging portions of each coupling member and engageable with each other when the coupling members are engaged to push the valve spools into an open position against the action of the springs.

* * * * *